May 26, 1931.                J. LEDWINKA                1,807,316
                      PRESSED METAL VEHICLE BODY
                   Filed March 9, 1925      5 Sheets-Sheet 1

INVENTOR.
JOSEPH LEDWINKA
BY
*ATTORNEY.*

May 26, 1931.  J. LEDWINKA  1,807,316
PRESSED METAL VEHICLE BODY
Filed March 9, 1925   5 Sheets-Sheet 4

INVENTOR.
JOSEPH LEDWINKA
BY
ATTORNEY.

May 26, 1931.  J. LEDWINKA  1,807,316
PRESSED METAL VEHICLE BODY
Filed March 9, 1925   5 Sheets-Sheet 5

FIG. 14

INVENTOR.
JOSEPH LEDWINKA
BY
ATTORNEY.

Patented May 26, 1931

1,807,316

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL VEHICLE BODY

Application filed March 9, 1925. Serial No. 13,949.

My invention relates to pressed metal vehicle bodies in general. Particularly, however, it has to do with the embodiment of the form of sill invented by me and covered in my application Serial No. 740,425, filed September 29, 1924, in a pressed metal vehicle body of the touring type. Such a sill has heretofore been applied only to vehicle bodies of the closed body type such as the sedan and the coupé, and my present invention is directed to the evolution of such a structure in a touring or open body as will enable me to utilize in the full in this type of body all of the many advantages which have been found to inhere in a sill of this type.

This sill is of channel cross section presenting downwardly, the side walls of which section are of different height, the inner being the shorter, and each side wall being provided with a flange turned outwardly of the body of the channel, the outer side wall being down turned. The upper surface of this inverted and flanged channel structure constitutes the threshold of the car in each door opening, the angle formed between the longer outer side wall and its out-turned flange receives the lower edge of the door, the down turned edge of the flange thereof receiving the lower overlapping flange of the door, and the angle formed by the shorter inner wall and its flange constitutes a floor board support. This inner wall is made of such height as to properly position the level of the floor with respect to the top of the sill (the bottom of the channel) so that the top of the sill and the outer portion thereof together practically constitute the threshold of the car. While conforming to these requirements, such a section has been found not only to be extremely strong, but also to possess a high degree of adaptability for the founding of connected frame members thereupon such, for example, as cross braces, seat supports, body posts in general, and for connection with the fore sills associated with the cowl panel at one end and with the tonneau sills associated with the tonneau unit at the other end. The foundation of these associated members and others upon such a sill, and the joints by means of which they are connected to the sill and to each other are, as a result of this construction, greatly simplified. According to my present invention I have devised a body frame construction for touring cars securing these advantages.

In the accompanying drawings I show one form of such body, in which—

Figure 1:
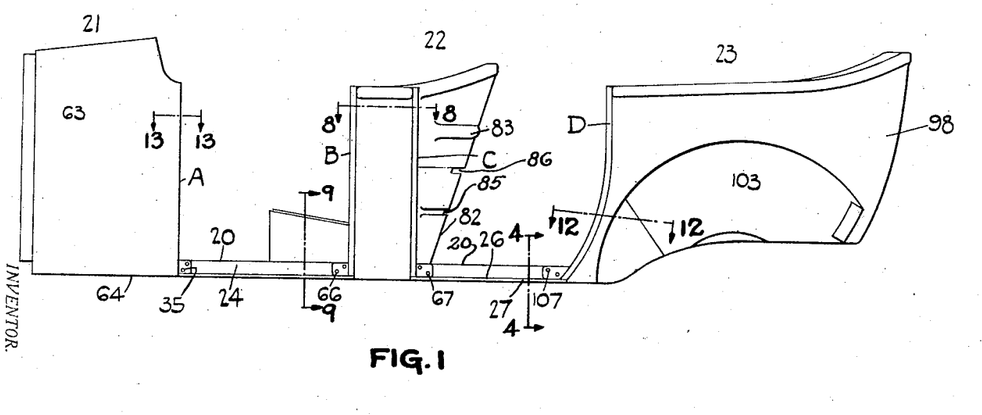
Fig. 1 is a side elevation of a touring car body with the doors removed.
Figure 2:
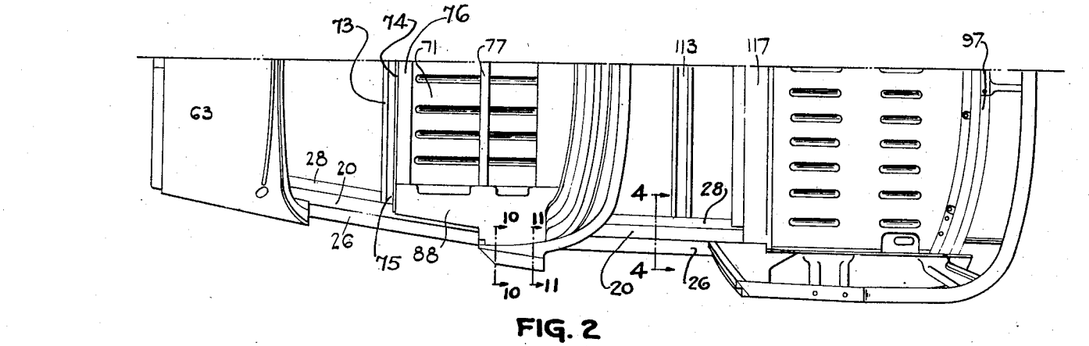
Fig. 2 is a plan view of the left half of such body.
Figures 4, 9, 10, 11, 12:
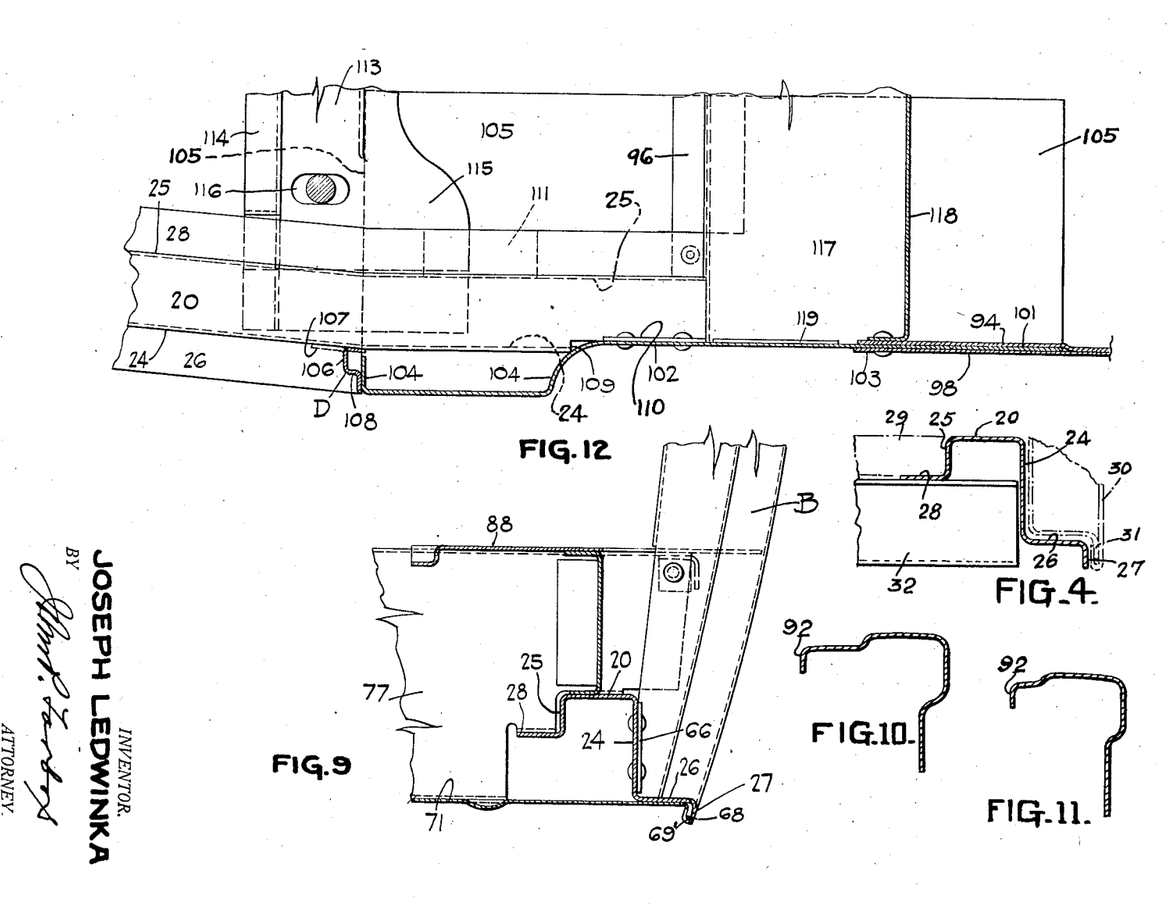
Fig. 4 is a transverse section on line 4—4 of Figs. 1 and 2 of the body side sill at the thresholds.
Fig. 9 is a section on line 9—9 of Fig. 1 looking in the direction of the arrows, with parts broken away.
Figs. 10 and 11 are, respectively, cross sections of the front seat back panel moulding on lines 10—10 and 11—11 of Fig. 2.
Fig. 12 is a sectional plan view of the rear end of the body side sill and its connection to cross braces, post D bracket, tonneau side sills and associated parts, taken approximately on line 12—12 of Fig. 1.

This body side sill which constitutes the main structural element of my present invention is shown in cross section in Fig. 4, a transverse section taken on line 4—4 of Figs. 1 and 2. It is designated generally by the numeral 20 applied to the bottom of the inverted channel which comprises its main body. These body side sills are the principal elements of the bottom skeleton frame upon which the cowl structure 21, front seat structure 22, and the tonneau structure 23 are erected, or to which, in case of unit construction and assembly, these parts are connected. Considered as units, these several structures themselves also embody skeleton frame works made up of longitudinally, vertically and transversely extending frame members, in combination with an outer shell or paneling. My invention resides largely in the construction of the skeleton frame works of these structures to combine with the main body side sills 20.

The inverted channel which comprises the main body of this side sill is comprised of a bottom wall 20, and outer and inner side walls substantially vertically disposed and designated, respectively, 24 and 25. The inner side wall 25 is of less height than the outer side wall 24. Both side walls are flanged outwardly of the channel, the flanges lying in substantially horizontal plane. The outer flange is designated 26 and has its outer edge down-turned as at 27. The inner flange is designated 28, and by reason of the lesser height of side wall 25, it lies at a higher level.

Thus it will be apparent that while the main body of this sill is comprised of an inverted channel section composed of bottom wall 20 and side walls 24 and 25, yet in toto it is composed of a series of angle sections. Its inner portion may be said to be of angle section composed of branches 25 and 28 presenting upwardly and inwardly of the body of the vehicle. This portion is adapted to receive the floor boards 29 of the body, which boards are supported directly upon the flange 28, as indicated in dotted lines. The inverted channel itself is but a series of angle sections. But the most prominent of the several angle sections is that comprised by branches 24 and 26 of the outer side of the channel and its flange. This comprises the outer portion of the sill and presents upwardly and outwardly of the body of the vehicle. In this angle are erected the various body posts which enter into the skeleton framework of the super-imposed structures 21, 22 and 23. In this angle, too, are embodied the lower edges of the doors 30, shown in dotted lines in Fig. 4. The bottom overlap 31 of the door overlaps the down turned edge 27 of branch 26 of this outwardly and upwardly presenting angle section. Body cross braces 32, also indicated in solid lines, cross-connect angles 25, 28, and 24, 26 on the under side.

Figure 13:
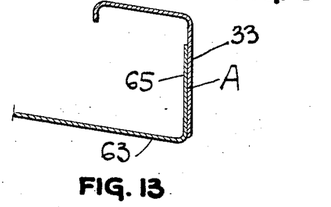
Figure 13 is a section on line 13—13 of Fig. 3 showing the A post in transverse section.

The cowl unit 21 is connected with the fore end of the sills 20. This cowl unit embodies a skeleton frame, the upper vertically-extending members of which are posts 33, commonly known as the A posts. These A posts are of angle cross section as shown in Fig. 13, presenting forwardly and outwardly of the body of the vehicle. Their lower ends are seated in the outer angle 24, 26 of the body side sill 20. The flange 26 at the front end of the sill where this post is located is depressed, as indicated at 34, to the general level of the lowermost edge of the down-turned portion 27. Upon this depressed portion, post 33 is seated. The rear face of the post 33 is substantially of the width of flange 26, whereby its inner face lies over against the other branch 24 of this angle constituted by the outer wall of the main channel section. A tab 35 struck from the base of the inner face of the post is turned inwardly and rearwardly and secured by riveting flatly to the vertically-extending branch 24. The base of the post along line 36 is gas welded to the horizontally-extending branch 26.

Figure 3:
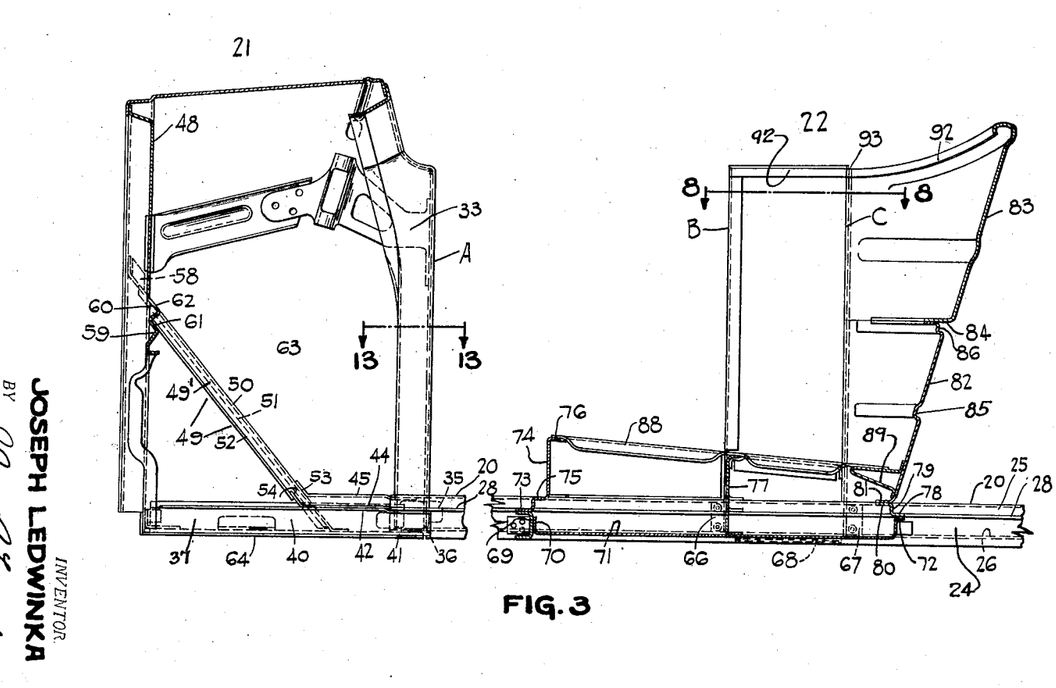
Fig. 3 is an enlarged section from the central vertical longitudinal plane of the body.
Figure 5:
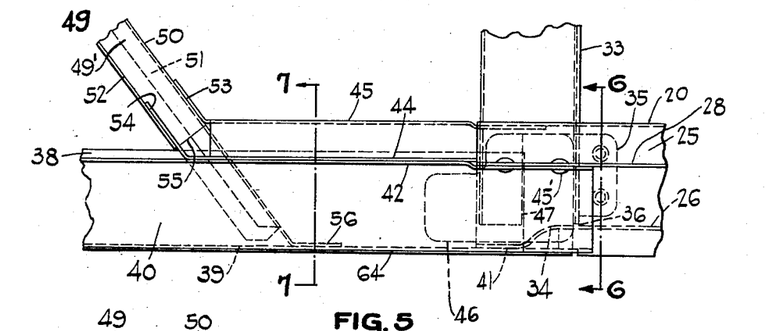
Fig. 5 is an enlarged view of the front end of the sill and its joinder to the cowl fore sill and the A post.
Figure 6:
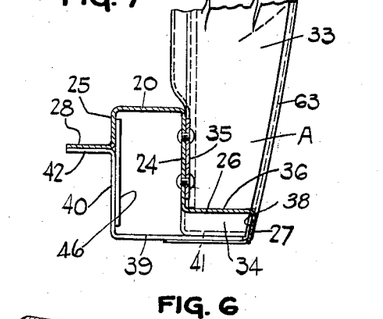
Fig. 6 is a transverse section on lines 6—6 of Fig. 5 showing the joint of Fig. 5 in transverse section.
Figure 7:
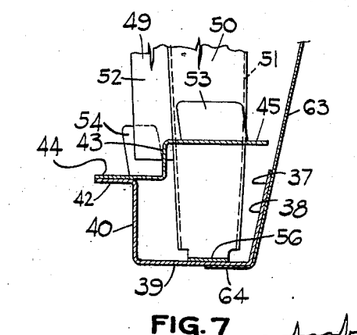
Fig. 7 is a transverse section on lines 7—7 of Fig. 5 showing the fore sill in transverse section.

The under longitudinally-extending member of the frame of this unit is comprised by a fore sill 37 in longitudinal extension of the main body side sills 20. This appears in Figs. 5 and 7, as well as in Fig. 3. This fore sill is comprised of an obverted channel section presenting upwardly. The outer side wall 38 and the bottom 39, however, are of considerably greater extent than the inner side wall 40, with the result that, as respects branches 38 and 39, this portion of the sill may be said to be of angle section presenting inwardly and upwardly of the body. At its rear end 41, this sill is extended under the depressed portion 34 of the flange 26 of sill 20 and spot welded and riveted thereto. In this position it underlies the foundation of the post A. The down-turned edge 27 of flange 26 is cut away for the length of the overlap so as to bring the vertically-extending branch of this fore sill into line with the down-turned edge 27. The width of channel 37 is substantially the combined width of branches 26 and 20 of the body side sill, with the result that the inner branch 40 lies substantially in the plane of the inner branch 25 of the side sill. Branch 40 of the fore sill is flanged outwardly of the channel (inwardly of the body) complementally to the flange 28 of the body side sill, and the two flanges are spot welded or riveted together, as indicated in Fig. 6. Spot welded to flange 42 is a channel covering and reinforcing member of Z cross section having a main body 43 and inner arm 44, and an outer overlying arm 45. The rear end of this member 43 has its arm 44 and the main body 43 terminate at the forward end of the main body side sill 20 but the flange 42 of the fore sill 37 is downwardly offset and extended rearwardly to underlie the flange 28 of the body side sill 20, where it is secured by rivets 45'. The fore end of the branch 44 in substantially the same plane as the floor board supporting flange 28, and the flooring may be run continuously from one to the other, as indicated in Fig. 5. The upper arm 45 is likewise extended rearwardly independent of the main body 43 and arm 44 as shown in Fig. 5, is offset downwardly and underlies the bottom 20 of the body side sill, whereby arm 45 in its fore portion is at the same level as the bottom 20. This overlap is welded. The relative widths of the parts are made such that branch 40 of the fore sill, branch 43 of the reinforcing and cover member of the fore sill, and branch 25 of the body side sill 20 lie substantially in the same plane at the base of post A. Here they are additionally joined together and reinforced by rectangular plate 46 welded commonly to all three members, the forward upper corner of this plate being cut away so that it can be accommodated in the available space.

The tab 35 does not represent all of the metal of the inner face of the A post, but only about half of it, as indicated by the line 47 (Fig. 5). The remaining margin of this face of the post is spot welded or otherwise secured to the branch 24 of the body side sill.

Shroud pan 48 is connected with the front ends of the fore sill 37. Between the shroud pan and the fore sill on each side there is arranged a supporting bracket or toe board support 49. This bracket, in the main, is of the usual form comprising a body web 49' extending from the fore sill to the shroud. Along its upper edge web 49' is flanged outwardly, as at 50, and downwardly, as at 51, and along its lower edge it is flanged inwardly, as at 52, to embody as a part thereof a Z section of a form complemental to the Z section support of the reinforcing member 43, 44, 45 of the fore sill. It is arranged so that these two Z sections are in continuation of each other in order that the floor boards may be extended obliquely upward toward the shroud and be supported by flange 52 of the toe board support in continuation of flange 44 of the fore sill. The fore end of the reinforcing member 45, designated 53, is extended forwardly of main body 43 of this member to overlap the arm 50 of the Z section of the toeboard support 49 where it is spot welded thereto. Similarly, the arm 44 of reinforcing member 43 is extended forwardly, as at 54 to overlap and be welded to the lower arm 52 of the Z section of the toeboard support. The Z section of the toeboard support terminates at these overlaps, as indicated by the terminal line 55, but branches 50, 49' and 51 are extended downwardly in the form of a channel to the bottom of the channelled section fore sill where the branch 50 is provided with an extension 56 spot welded to the bottom of the fore sill.

At its front end the toeboard support is joined to the cowl by outurned flange 58 welded to the cowl panel 63, while the Z section 50, 49' and 52 of the supporting bracket 49 for the floor boards conjoins the shroud pan 48. In the shroud pan are depressed rearwardly from its body plane a pair of furrows 59, 60, contiguous to each other, forming on the rear face of the shroud pan a pair of projections forming the steps 61, 62, located in the plane of the arm 50 and 52 of the Z section 50, 49', 52 of the toeboard support. Thereby the lower oblique step 61 supports the front edge of the foremost floor board and the upper step 62 constitutes the metallic finishing margin for the front floor. This construction of the shroud pan floor board support has been found to be superior in simplicity, low cost and fine appearance to constructions heretofore used.

These frame elements and others together support and in turn are interbraced by the cowl panel 63. This cowl panel is usually formed of one piece extending from side to side of the body over the top of the structure. Its lower edges 64 are flanged under the body fore sills 37 and the fore end of the body side sill 20 (Fig. 5) and spot welded thereto. The rear edge of the panel 63 is, however, flanged inwardly, as at 65, and is spot welded to the outwardly-extending branch of the post A on its its front face.

The front seat structure 22 is erected intermediate the ends of the main body side sill 20. Like the cowl structure, it, too, comprises vertically-extending body posts founded in the outer angle section 24, 26 of the sill. These posts are designated B, C. They are of channel section presenting inwardly of the body of the car, are of considerable width, and constitute both posts and body side panel. At the bottom, these C, B posts are provided with outturned tabs 66, 67, on opposite sides, and these tabs are spot welded and riveted to the vertically-extending branch 24 of this outer angle section of the sill, while the side walls of the channel are abutted against (see Fig. 9), and gas welded to the horizontally-extending branch 26 of the sill. As indicated by the lines 68 (Fig. 3), the bottom wall of the channel or outer surface of the panel is extended downwardly past the inwardly offset down-turned portion 27 of the sill in this region, and turned under and over this down-turned portion, as indicated at 69' in Fig. 9, the bottom edge of the down-turned portion 27 being cut away to a depth equal to the gauge of the metal of the post whereby continuity of the bottom line of the down-turned edge 27 is preserved.

Extending from sidesill to side sill near the front of the structure is a body cross brace 69 presenting forwardly of the body, having its upper side wall (Fig. 3) welded and riveted to the inner branch 28 of the body sills, and its bottom side wall welded and riveted to the outer branch 24. Spot welded to the bottom wall of channel cross brace 69 is the upturned flange 70 of a seat bottom pan 71, the edges of the ends and back of which are flanged, as at 72, and in turn spot welded to the under side of the inner branch 28 of the body side sills 20. This bottom pan itself constitutes a cross brace of the bottom skeleton frame of the body. Seated on the upper side wall of cross brace channel 69 is the forwardly extending flange 73 of the heelboard 74. The body of this heelboard is forwardly offset at the floor level, indicated at 75, to provide for the support of the floor on the base flange 73 and to constitute the offset 75 a metallic finishing margin for the floor. The top of the heel board 74 is turned inwardly of the seat structure. Its sides are formed in one piece with the body 74 and continued rearwardly in the channel section shown in Fig. 9, the top wall of the form of a channel being in continuation of the flange 76 of the heel board 74. The bottom wall of this side channel, however, is formed reversely as respects offset 75, and is located at the level of the top of sill 20, and is seated upon and spot welded to the top of sill 20, extending thereupon back as far as the front face of the posts B and C. Here the end is turned inwardly and spot welded to the front face of a channel shaped cross brace 77 presenting rearwardly. The lower side wall of this channel is rested upon the top of the body side sills 20, the base wall of the channel is rested upon and welded to the inside of the front face of the B, C posts, and the top side wall of the channel lies in the plane of the seat bottom.

Seated on the flange 72 of the combined seat bottom pan and cross brace 71 is the arm 78 of a Z section cross brace member having a main body 79 and a forwardly extending upper arm 80 in the plane of the top of body side sills 20. Founded upon and welded to this upper arm 80 in turn is the forwardly-extending base flange 81 of the lower section 82 of front seat back panel 82, 83. This front seat back panel is formed in two sections 82, 83, and divided in a plane 84 at the upper side of one of the two tacking strip channels 85, 86 depressed in the back of the seat back panel. The division on line 84 is made by forwardly flanging the sections 82, 83, respectively, and welding or otherwise securing the flanges together. Because divided in the tacking strip channel, the plane of division may be hidden since upholstery (not shown), covering the lower part of this seat back panel, may hide the joint.

The seat pan 88 is supported jointly from the front heelboard 74 where it is spot welded to flange 76, from the seat structure and body cross brace 77 where it is spot welded to the upper side wall of the channel section (see Fig. 9), and from the seat back panel 82, 83 where it is supported by means of small angle brackets 89 spot welded to the inner surface of panel 82.

Figure 8:
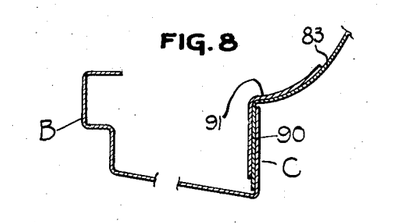
Fig. 8 is a transverse section of the B and C posts of the body on lines 8—8 of Figs. 1 and 3.

The sides of the seat back panel 82, 83 are provided with outturned flanges 90 spot welded to the inside of the rear face of the B and C post. This joint is reinforced by an angle member 91 spot welded both to the panel 82, 83 and to the B, C post (Fig. 8). At the top, the seat back panel is provided with the usual finish moulding 92 formed in one piece with the panel itself. This comprises a forwardly and downwardly turned flange of the form shown in Fig. 3 adapted not only to serve as a finish strip, but also to receive and retain the upholstery beneath it. The tops of the B and C posts are also provided with finish moulding formed in one piece with the post structure. This is shown in section in Figs. 10 and 11. The section of Figure 10 is a section at the front of the post, while the section of Fig. 11 is a section at the rear. Both sections embody a form adapted to constitute the complete finish moulding for the side of the entire extension of that moulding formed at the tops of the doors. That section at the rear, however, embodies not only the continuation of the moulding from the rear doors, but also a continuation of the moulding 92 from the front seat back panel. The moulding of the front seat back panel is curved on a line to bring it substantially tangent to the front of the post were it projected forwardly a sufficient distance, but it is stopped on line 93 substantially at the rear of the post. From this point it is continued by the section of Fig. 11 until it merges into the normal side moulding of Fig. 10. Both sections, as aforesaid, are formed in one piece with the upper end of the post.

The tonneau construction, 23, erected at the rear ends of the sills, comprises in its turn vertically-extending frame members in the form of the post designated D, longitudinally-extending members in the form of tonneau side sills 94, and transverse-extending members (Figs. 12 and 14) in the form of body cross braces 95, 96, and rear tonneau sills 97, together with other such members entering the side structure.

Figure 14:
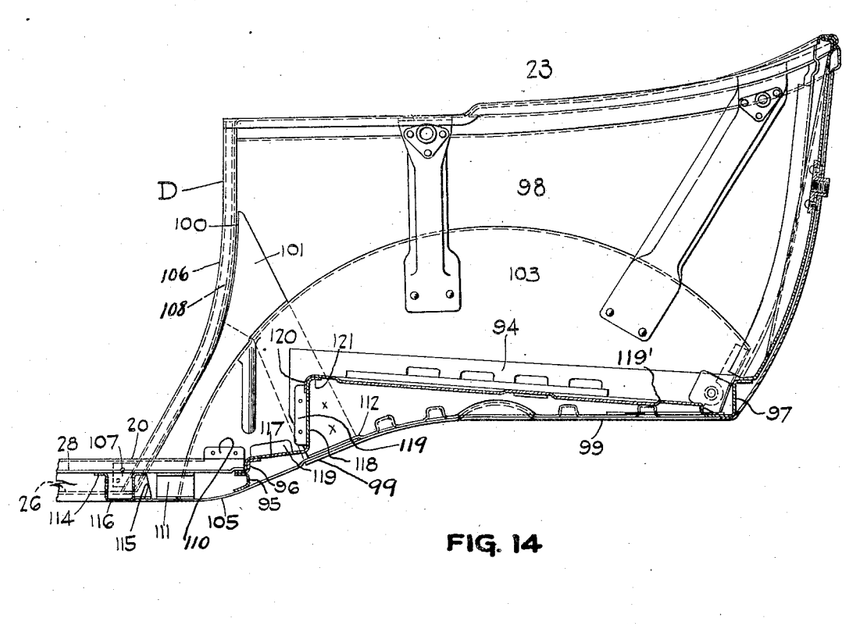
Figure 14 is an enlarged section from the rear vertical longitudinal plane of the body showing the tonneau construction.

The tonneau paneling 98 encloses this frame structure and is connected with it mainly by the under-turned flange 99 welded to the tonneau side and rear sills 94, 97, and by the inturned front edge flanges 100 welded to the front face of the D posts. Interconnection through the sill itself is made with the intermediary of post D bracket 101. This bracket is comprised of a main body 102 of concave formation in continuation of the wheel-housing portion 103 of the tonneau, and a shell portion 104 of channel cross section, together with an inturned bottom flange 105. The D posts are erected upon the top of this bracket. The rabbeted extension 106 of the front face of the D posts is extended down the front face of the bracket 101, as shown in Fig. 12. At its bottom it is provided with an outturned tab 107 welded to the outer branch of the body side sill and riveted thereto. It is seam-welded along line 108 to the horizontally-extending branch 26 of this outer angle of the body sill. Branch 26 of the main side sill 20 is stopped at line 108. Branch 24 is continued for a distance to a jog 109 made to make way for the main body 102 of the bracket. Branches 20, 25 and 28 are continued rearwardly still further. Branch 20 is provided at its rear end with an upturned flange or tab 110 spot welded and riveted to the inner face of the body 102 of the bracket. Branch 28 overlies and is spot welded and riveted to the forwardly-extending flanges of cross braces 95, 96 (Fig. 14). Near its end, branch 28 is spot welded to a spacing member 111 interposed between it and the underlying flange 105 of the bracket. The tonneau side sill has its front end offset as at 112 and is inclined forwardly to nest within the angle between the body 102 of the bracket and the under flange 105, where it is spot welded thereto, as indicated by the cross marks.

Interconnecting the D post brackets 101 and the body side sills 20 at this point is a main body cross brace 113 of channel section presenting upwardly and having its side walls flanged outwardly, as at 114. The forward flange is welded and riveted to the underside of the branch 28 of the body side sill, while the rearward flange and the channel side wall are together flattened out to form a wing 115 at the general level of the bottom of the channel, and also of the under flange 105 of bracket 102. Both the bottom of the channel 113 and this wing 115 are spot welded and riveted to flange 105 of the bracket. The bottom of the channel is provided with an elongated bolt hole 116 to receive the chassis-securing bolt. Cross braces 95, 96 of the tonneau structure are in the rear of this main body cross brace which interconnects sills and brackets both on the same and on the opposite sides of the machine. Cross brace 95 presents forwardly, being secured by its lower side wall to the under flange 105 of the bracket. Member 96 is of Z cross section having its lower arm seated on channel 95 and secured as aforesaid to branch 28 of the sill, but with its upper arm pointing rearwardly. The upper arm supports the fore edge of the horizontal portion 117 of the rear seat heelboard 118, the ends of which are provided with tabs 119 secured to the post D bracket and to the tonneau side sills. And upon the heelboard 118 is supported the front end of seat pan 119'. The seat pan is provided with a frontal down-turned flange 120 overlapping the front of the heelboard and is welded in place to flange 121 of the heelboard, extending inwardly of the seat structure. Its rear end is supported from the tonneau rear sill as shown.

The structures I have described in detail I have found to possess marked advantage in simplicity, cheapness of manufacture, lightness, sturdiness, durability, and assure to me in a touring car body the full advantages adhering in the sill itself. The combinations of elements entering into them may be varied both as to the form of elements and as to their combinational relations, in some instances at least, without departing from my invention. I desire to cover each and every such modification in the appended claims.

1. A pressed metal automobile body comprising a body side sill of inverted channel cross section, the outer side wall of which is provided with an outturned flange having a down-turned edge defining the lower edge of the body, which outturned flange is depressed at its forward end to the general level of said edge, and a body post having its lower end seated on said depressed portion and secured to the outer side wall of said channel.

2. A pressed metal vehicle body comprising a body side sill, the outer portion of which is of angle cross section presenting upwardly and outwardly, and the horizontal branch of which is depressed at its fore end, and a pressed metal body post seated on said depressed portion and connected with said vertical branch of the section.

3. In a pressed metal vehicle body, a body side sill the outer portion of which is of angle cross section presenting upwardly and outwardly, the horizontally-extending branch of said angle section being provided with a down turned flange on its outer edge and a depressed fore end at the general level of the lower edge of said flange, a sill extension secured to said depressed end at substantially the same level, and a cowl panel connected with said sill extension and lapped under the same.

4. In a pressed metal vehicle body, a body side sill including a portion of angle cross section presenting upwardly and outwardly, the lower branch of which angle is downwardly flanged, and the fore end of which lower branch is depressed to the general level of the lower edge of said flange, and a fore end extension of said side sill of angle section presenting upwardly and outwardly, having its lower branch lapped upon and secured to the depressed lower branch of the body side sill.

5. A pressed metal vehicle body comprising a body sill of inverted channel section, the side walls of which are each provided with outturned flanges, but at different levels, the inner side wall being less height than the outer, and a fore extension of said sill of a section having horizontally and vertically-extending branches, the horizontally-extending branch of which is secured to the flange of the outer wall of said body sill, and the vertically-extending branch of which lies substantially in the plane of the inner side wall of said body sill channel, said vertically extending branch being provided with an outturned flange substantially in continuation of the outturned flange of said channel inner side wall.

6. A pressed metal vehicle body comprising a body side sill the main body of which is of inverted channel cross section adapted to support body posts and terminating in the front post region, and a fore sill extension thereof of obverted channel section extending into the cowl.

7. A pressed metal vehicle body comprising a body side sill of inverted channel cross section, the side walls of which are provided with opposite laterally extending flanges adapted to constitute, respectively, the outer portion of the threshold and the inner floor board support and a fore sill extension of obverted channel section, the bottom wall of which is connected with the laterally extending flange of the outer wall of the body sill, and the inner wall of which is flanged in substantial continuation of the laterally extending flange on the inner wall of the body sill.

8. A sectional body side sill having a joint in the front post region comprised of oppositely disposed Z cross sections having their adjacent arms welded together and disposed below the sill top to constitute a floor board support and their non-adjacent arms spaced apart and constituting, respectively, sill bottom and sill top.

9. A pressed metal vehicle body comprising a body side sill, the outer portion of which is of angle cross section presenting upwardly and outwardly, and a body post of angle cross section presenting forwardly and outwardly and having its lower end secured in the angle of said side sill, said body post being provided with a tab struck from the inner branch thereof for securement to the vertical branch of the body side sill.

10. A pressed metal vehicle body comprising a fore sill having a main body of channel cross section presenting upwardly, said fore sill being provided with portions constituting a floor board support and a covering for the channel sill, respectively, and a toe board support of a section having one arm connected with said floor board support portion and the other arm connected both with said channel covering portion and with the bottom wall of said channel.

11. In a pressed metal vehicle body comprising a body fore sill of channel cross section, the inner wall of which is provided with a laterally extending flange, and an independently secured member of Z cross section, the inner arm and main body of which cooperate with said flange to support the floor and properly position the same, and the outer arm of which serves as a cover for the channel opening at the floor sides.

12. A pressed metal vehicle body comprising a body side sill, the outer portion of which is of angle cross section presenting upwardly and outwardly, and a body post of channel cross section having its lower end mounted upon the lower branch of said sill section, the bottom wall of said channel being lapped under said lower branch.

13. A pressed metal vehicle body comprising a body side sill having a portion of angle cross section presenting upwardly and outwardly, the lower branch of said angle being provided with a downwardly presenting flange, and a body post of channel cross section having its end seated on said lower branch of said sill section, the bottom wall of said body post being lapped over and secured to said downwardly extending flange, and the side walls thereof being secured to the upper branch of said sill section.

14. A body side sill of inverted channel cross section constituting the threshold of the car, a body post of channel cross section secured to the outer side wall of said sill section, and a seat support mounted upon the base of said channeled sill and also secured to the side walls of said channel section of the post.

15. A pressed metal vehicle body comprising a body sidesill of inverted channel cross section, the inner side wall of which is flanged outwardly of the channel to provide a floor board support, a post D bracket generally of angle cross section in the angle of which is disposed said sill section, and a body cross brace of channel cross section presenting upwardly, having one side wall connected with said floor board support flange and the other side wall depressed and connected with the lower branch of the angle of said post D bracket.

16. A pressed metal vehicle body comprising a body side sill of inverted channel cross section, the side walls of which are of a different height, the inner being shorter and inwardly flanged to form a floor board support, a post D bracket transversely of angle cross section and having its lower branch underlying said sill, a spacing member between the lower branch of the bracket and the inner branch of the sill sections, and a body cross brace having its end projected between said floor board supporting flange and said lower branch of the post D bracket and connected to both of them.

17. A pressed metal vehicle body comprising a post D bracket of angle cross section, a body side sill nested in the angle of said section, and a body cross brace secured between the under side of said sill and the lower branch of said post D bracket.

18. A pressed metal vehicle body comprising a post D bracket, and a body side sill, each having section branches extending inwardly of the vehicle body but at different elevations, and a body cross brace of a section having branches secured, respectively, to the branches of said sill and bracket.

19. A pressed metal vehicle body comprising a post bracket, a body cross brace connected with the bracket intermediate its ends, and a body side sill connected with said bracket and terminating upon and connected to said cross brace.

20. A pressed metal vehicle body comprising a body side sill of inverted cross section, the side walls of which are of different height, the inner being the shorter, and a post bracket of angle cross section in the angle of which said sill is nested, together with a spacing member of channeled section, the side walls of which are, respectively, connected with the lower branch of the angle of said bracket and with the floor supporting flange of the inner wall of the channel.

21. A pressed metal vehicle body sill structure comprising inverted and obverted channels of pressed metal arranged end to end with their adjacent ends overlapping and longitudinally joined together in their overlapping portions.

22. A sill structure for vehicle bodies comprising inverted and obverted metal channel sections arranged end to end with their adjacent ends overlapping and longitudinally joined together in their overlapping portions through their side walls on one side and through a bottom wall and a side wall on the other side.

23. A sill structure for vehicle bodies comprising a pressed metal section of downturned channel formation having laterally flanged side walls, together with a second pressed metal sill section of different cross section in longitudinal extension of said first-named section and longitudinally joined to the flanges of said side walls of said first-named section.

24. In a pressed metal vehicle body construction, a longitudinally extending body sill having a portion of angle cross section presenting upwardly and outwardly, the lower branch of which is provided with a depending flange, and a door post of inwardly presenting channel section founded upon and secured in the angle of said sill, said door post having its outer wall lying substantially flush against and extending to the bottom line of the depending flange and secured thereto.

In testimony whereof I hereunto affix my signature.

JOSEPH LEDWINKA.